US012651865B2

(12) United States Patent
Dobler

(10) Patent No.: US 12,651,865 B2
(45) Date of Patent: Jun. 9, 2026

(54) PLUG COUPLING HAVING TWO FEMALE PLUG CONNECTORS AND A LOCKING ASSEMBLY FOR EACH

(71) Applicant: Neutrik AG, Schaaan (LI)

(72) Inventor: Oliver Dobler, Tschagguns (AT)

(73) Assignee: Neutrik AG, Schaan (LI)

( * ) Notice: Subject to any disclaimer, the term of this patent is extended or adjusted under 35 U.S.C. 154(b) by 308 days.

(21) Appl. No.: 18/564,753

(22) PCT Filed: Jun. 23, 2022

(86) PCT No.: PCT/EP2022/067142
§ 371 (c)(1),
(2) Date: Nov. 28, 2023

(87) PCT Pub. No.: WO2023/285097
PCT Pub. Date: Jan. 19, 2023

(65) Prior Publication Data

US 2024/0380159 A1 Nov. 14, 2024

(30) Foreign Application Priority Data

Jul. 12, 2021 (AT) .............................. A 50570/2021

(51) Int. Cl.
*H01R 13/627* (2006.01)
*H01R 13/11* (2006.01)
(Continued)

(52) U.S. Cl.
CPC ......... *H01R 13/6275* (2013.01); *H01R 13/11* (2013.01); *H01R 13/635* (2013.01);
(Continued)

(58) Field of Classification Search
CPC .............. H01R 13/6275; H01R 13/635; H01R 2201/04; H01R 24/64; H01R 31/06
(Continued)

(56) References Cited

U.S. PATENT DOCUMENTS 4,268,109 A * 5/1981 Hardesty ............. H04M 1/0293 439/676
4,806,117 A * 2/1989 Johnston ................ H01R 24/62 439/736
(Continued)

FOREIGN PATENT DOCUMENTS

CN 208904344 U 5/2019
DE 29905338 U1 6/1999
(Continued)

*Primary Examiner* — Marcus E Harcum
(74) *Attorney, Agent, or Firm* — Volpe Koenig

(57) ABSTRACT

A plug connector coupling, in the housing of which at least two female plug connectors are formed, are arranged such that they are rotated by 180° relative to one another about a common axis. For each female plug connector, a locking assembly is provided for each cable plug. The contact elements of both female plug connectors belong to a common contact set, in which the contact elements are guided in a crossing manner and same are arranged on opposing sides and rotated by 180° relative to one another about the common axis. Two locking arms are also arranged in an opposing manner relative to the common axis.

12 Claims, 3 Drawing Sheets

(51) Int. Cl.
*H01R 13/635* (2006.01)
*H01R 24/64* (2011.01)
*H01R 31/06* (2006.01)
*H01R 13/52* (2006.01)

(52) U.S. Cl.
CPC ............. *H01R 24/64* (2013.01); *H01R 31/06* (2013.01); *H01R 13/5213* (2013.01); *H01R 2201/04* (2013.01)

(58) Field of Classification Search
USPC .......................................... 439/638, 357, 358
See application file for complete search history.

(56) References Cited

U.S. PATENT DOCUMENTS

| | | | | | |
|---|---|---|---|---|---|
| 4,904,209 | A * | 2/1990 | Nelson | H01R 24/62 | 439/736 |
| 5,328,390 | A * | 7/1994 | Johnston | H01R 31/02 | 439/676 |
| 6,139,332 | A * | 10/2000 | Tsai | H01R 39/64 | 439/21 |
| 6,146,207 | A * | 11/2000 | Mulot | H01R 31/06 | 439/344 |
| 6,383,028 | B1 * | 5/2002 | Chang | H01R 31/06 | 439/676 |
| 6,736,670 | B2 * | 5/2004 | Clark | H04Q 1/13 | 439/541.5 |
| 7,048,550 | B2 * | 5/2006 | Hyland | H01R 31/005 | 439/67 |
| 7,572,148 | B1 * | 8/2009 | Pepe | H01R 13/6589 | 439/607.05 |
| 7,824,232 | B2 * | 11/2010 | Daly | H01R 24/64 | 439/676 |
| 8,496,500 | B1 * | 7/2013 | Wu | H01R 13/6461 | 439/676 |
| 9,075,205 | B2 * | 7/2015 | Pepe | G02B 6/3895 | |
| 9,966,716 | B2 * | 5/2018 | Soohoo | H01R 31/06 | |
| 10,153,587 | B1 * | 12/2018 | Lai | H01R 13/6273 | |
| 10,483,704 | B1 * | 11/2019 | Solland | H01R 29/00 | |
| 10,732,358 | B2 * | 8/2020 | Bretz | G02B 6/38 | |
| 11,233,351 | B1 * | 1/2022 | Johnson | H01R 13/641 | |
| 2003/0199200 | A1 * | 10/2003 | Chan | H01R 31/06 | 439/638 |
| 2004/0180580 | A1 * | 9/2004 | Pepe | H01R 31/02 | 439/638 |
| 2007/0032119 | A1 | 2/2007 | Ting | | |
| 2008/0032560 | A1 * | 2/2008 | Shi | H01R 13/6275 | 439/638 |
| 2011/0243505 | A1 * | 10/2011 | Su | H01R 24/64 | 385/75 |
| 2014/0016902 | A1 * | 1/2014 | Pepe | H01R 13/62 | 403/376 |
| 2019/0109414 | A1 * | 4/2019 | Miller | H01R 24/20 | |
| 2019/0221970 | A1 * | 7/2019 | Wu | H01R 13/629 | |
| 2019/0244065 | A1 * | 8/2019 | Chuang | G06K 7/0021 | |
| 2020/0026007 | A1 * | 1/2020 | Dobler | G02B 6/3874 | |
| 2021/0013660 | A1 * | 1/2021 | Markefka | H01R 13/42 | |

FOREIGN PATENT DOCUMENTS

| | | | | |
|---|---|---|---|---|
| DE | 102004022865 | A1 * | 12/2005 | H01R 13/743 |
| DE | 102016117204 | A1 * | 3/2018 | H01R 13/6205 |
| EP | 2760085 | A1 * | 7/2014 | H01R 31/06 |
| JP | 2011243304 | A | 12/2011 | |
| KR | 101013671 | B1 * | 2/2011 | H04M 1/0274 |
| WO | 1999045611 | A1 | 9/1999 | |
| WO | 2014190744 | A1 | 12/2014 | |
| WO | 2021058129 | A1 | 4/2021 | |
| WO | WO-2021067274 | A1 * | 4/2021 | H01R 43/26 |

* cited by examiner

PLUG COUPLING HAVING TWO FEMALE PLUG CONNECTORS AND A LOCKING ASSEMBLY FOR EACH

CROSS-REFERENCE TO RELATED APPLICATIONS

This application is a § 371 National Phase of PCT/EP2022/067142, filed Jun. 23, 2022, which claims priority of Austrian Patent Application No. A50570/2021, filed Jul. 12, 2021, the entire contents of all of which are incorporated by reference herein as if fully set forth.

FIELD OF THE INVENTION

The invention relates to a plug connector coupling.

BACKGROUND

A coupling which has a housing consisting of two plugged-together extruded profiles with an L-shaped design in cross-section, wherein in each case one standard plug socket for data cable plugs, preferably RJ45 plugs, is inserted at both open ends of the overall cuboid housing, is known from the company Neutrik AG under the name NE8FF. For this purpose, the plug sockets which are arranged one behind the other on a common axis and are present in a symmetrical orientation with respect to a transverse central plane are screwed in place by means of special adapter flange plates at the end sides of the housing. The compensation printed circuit boards which are provided on the rear side of the plug sockets and into which the contact elements of the plug sockets are soldered are connected to each other by individual cables. Each of the plug sockets is provided with a locking device as standard which interacts with the plugged-in complementary cable plug and prevents the plug from being pulled out inadvertently and undesirably and hence the plug connection being disconnected. For this purpose, the locking assembly comprises a locking arm with a locking projection which, in the plugged-in state of the cable plug, engages in a locking recess at the cable plug, preferably at a socket-like plug-in part. An actuating element, protruding beyond the end sides of the housing, for acting on the locking arm is also present. Starting from a passive position, it can be displaced counter to the action of a restoring element by hand in the longitudinal direction of the housing into an active position in which the locking structures of the cable plug and the plug socket are disengaged in order to disconnect the plug connection of the respective side. The cable plug can then be pulled out from the plug-in opening of the standard cable socket.

A product with a similar construction has been brought to market by the company Ningbo Haishu Seetronic Electronics Co. Ltd under the name SE8FF or SE8FF-X. Here too, standard plug sockets for in particular RJ45 data plugs are attached at the end sides of a cuboid housing. These plug sockets are again arranged one behind the other on a common axis but now rotated about the common axis by 180° relative to each other. The actuating assemblies are consequently of course also rotated about the common axis by 180° relative to each other, as a result of which handling proves to be rather more awkward and a user has to change their grip in order to disconnect the two plug connections on opposite sides.

A product has come onto the market from the company Neutrik AG under the name NE8FFX6-W in which two plug sockets arranged on a common axis with plug-in openings oriented in opposite directions are formed in a housing. These plug sockets are, as is the case with the NE8FF coupling, likewise arranged one behind the other on a common axis and oriented in a symmetrical orientation with reference to a transverse central plane of the housing. The electrically conductive connection between the plug sockets is established by an elaborate specially manufactured contact set in which the contact elements are retained in a plane, flat insulating body. The locking assembly comprises two locking arms which, together with the actuating element, form a single component.

The housing comprises two contact carriers in a symmetrical orientation with reference to a transverse central plane of the housing, as well as two half-shells which are split in the direction of the common axis, which are pressed against each other by a sleeve of elastic material, and fix the contact carriers. The sleeve thus also covers the actuating element and protrudes beyond the shell in the direction of the common axis, wherein a radially inward facing sealing lip is provided at its two ends.

RJ45 couplings with plug-in directions rotated by 180° at the two ends are disclosed, for example, in DE 29905338 U1, WO 9945611 A1, and U.S. Pat. No. 20,070,32119 A1 but with no active locking devices of any type at the couplings. The actuatable locking takes place at the two cable plugs, whilst the couplings only have corresponding interlocking connections.

The object of the present invention is to overcome the disadvantages of the prior art and to make available a device which combines simple economic manufacture with flexible use and good operating comfort.

This object is achieved by a device and a method according to one or more of the features disclosed herein.

SUMMARY

The device according to the invention provides that the contact elements of both plug sockets are part of a common contact set in which the contact elements are routed so that they cross each other and are arranged on the opposite sides so that they are rotated about the common axis by 180° relative to each other, and two locking arms are arranged opposite each other with respect to the common axis. Such contact sets are components which can be produced simply and economically and can be obtained simply, the use of which for the coupling according to the invention enables a simple structure and economic manufacture. The two opposite locking arms enable for each side a mode of construction which can be designed functionally optimally with no restrictions by the in each case different locking assembly.

For this purpose, the locking assemblies are preferably equipped with in each case an independent actuating element and an independent restoring element and can be actuated independently of each other. Each side can thus be locked and unlocked independently of the other side, whereby, when one side is unlocked, the opposite side is also locked and is secured with respect to the plug being pulled out unintentionally.

According to an advantageous embodiment, the actuating elements are arranged on sides opposite each other by 180 degrees with reference to the common axis. These actuating elements are thus arranged in a mutual position such that, when the user takes hold of the coupling, they can intuitively be brought into an ergonomically favorable position in which it is possible for an amount of force which can be easily regulated to be exerted simultaneously on both actuating elements.

Alternatively or also in combination therewith, it can be provided according to a further embodiment of the invention that the actuating elements are arranged in the same plane transversely to the common axis. This has the advantage that both the actuating forces and the reaction forces all act in a line. The plane in which the actuating elements lie is preferably the longitudinal central plane of the coupling according to the invention.

In order optimally to combine the exertion of force when the plug connections are unlocked and holding the coupling during the manipulation, an advantageous embodiment of the invention provides that the direction of the displacement of the actuating elements between their passive position and their active position predominantly runs radially with reference to the common axis.

A very simple and economic structure can be obtained with an embodiment according to the invention in which the locking arm is rigidly connected to its actuating element. A variant with a one-piece structure of the locking arm and actuating element is particularly preferred here.

The invention is preferably implemented in such a way that the housing comprises two contact carriers and a shell fixing these contact carriers in their relative position to each other, wherein the contact carriers are arranged on a common axis and rotated about the common axis by 180° relative to each other. Very effective manufacture and storage of the individual parts required therefor are thus possible because only the contact carriers and the electrical contact elements have to be configured in accordance with the plug connector standard and the other components of the coupling can always have the same structure for all or at least for a group of coupling types.

For simple manufacture, a structure of the coupling is advantageous which is characterized in that the shell consists of two half-shells split in the direction of the common axis which are held together by a sleeve made from non-metallic material, this simplifying the assembly.

A preferred variant of the coupling here has a sleeve which is made from an elastic material and presses the half-shells against each other. The sleeve which is in any case advantageous for protecting the coupling replaces conventional connecting means such as screws, clamps, or the like such that mounting bores, bearing surfaces, or similar structures can be avoided and the components can be held very easily.

It is advantageously also provided here that the sleeve also covers the actuating elements and has structures in the region of the actuating elements in order to enable the manual displacement of the actuating elements. The region of the actuating elements which must be routed from the inside of the coupling to the surface in order to be able to be actuated manually.

The sleeve can advantageously also assume a further function if, according to a further embodiment according to the invention, protrudes beyond the shell in the direction of the common axis and has a radially inward facing sealing lip at its two ends. When a complementary plug connector is plugged in, the plug-in opening is then sealed and the penetration of dirt or moisture prevented. With an appropriate choice of material and design, a protection class of up to IP65 is possible.

A further advantageous embodiment of a coupling according to the invention is characterized in that the contact set is inserted into a frame, the opposite sides of which along the common axis are pushed into the contact carriers.

A variant is preferred here in which the frame is designed from two frame parts which are opposite each other with reference to the common axis and overlap each other in the central section of the contact set, viewed in the direction of the common axis.

It is furthermore advantageously provided for these embodiments that at least parts of the actuating assembly, preferably the whole actuating assembly, are supported or held in on or on the frame.

BRIEF DESCRIPTION OF THE DRAWINGS

For a better understanding of the invention, it will be explained in detail on the basis of the following Figures.

In the drawings, in each case in a highly simplified schematic representation.

DETAILED DESCRIPTION OF THE PREFERRED EMBODIMENTS

It should be established at the outset that the same parts are provided with the same reference signs and the same component names in the various described embodiments, wherein the disclosures contained in the whole description can be transferred analogously to the same parts with the same reference signs and the same reference names. The positional specifications chosen in the description such as, for example, above, below, laterally, etc are also made with reference to the directly described and illustrated Figures and, in the case of a change in position, these positional specifications are to be transferred analogously to the new position.

Figure 1:
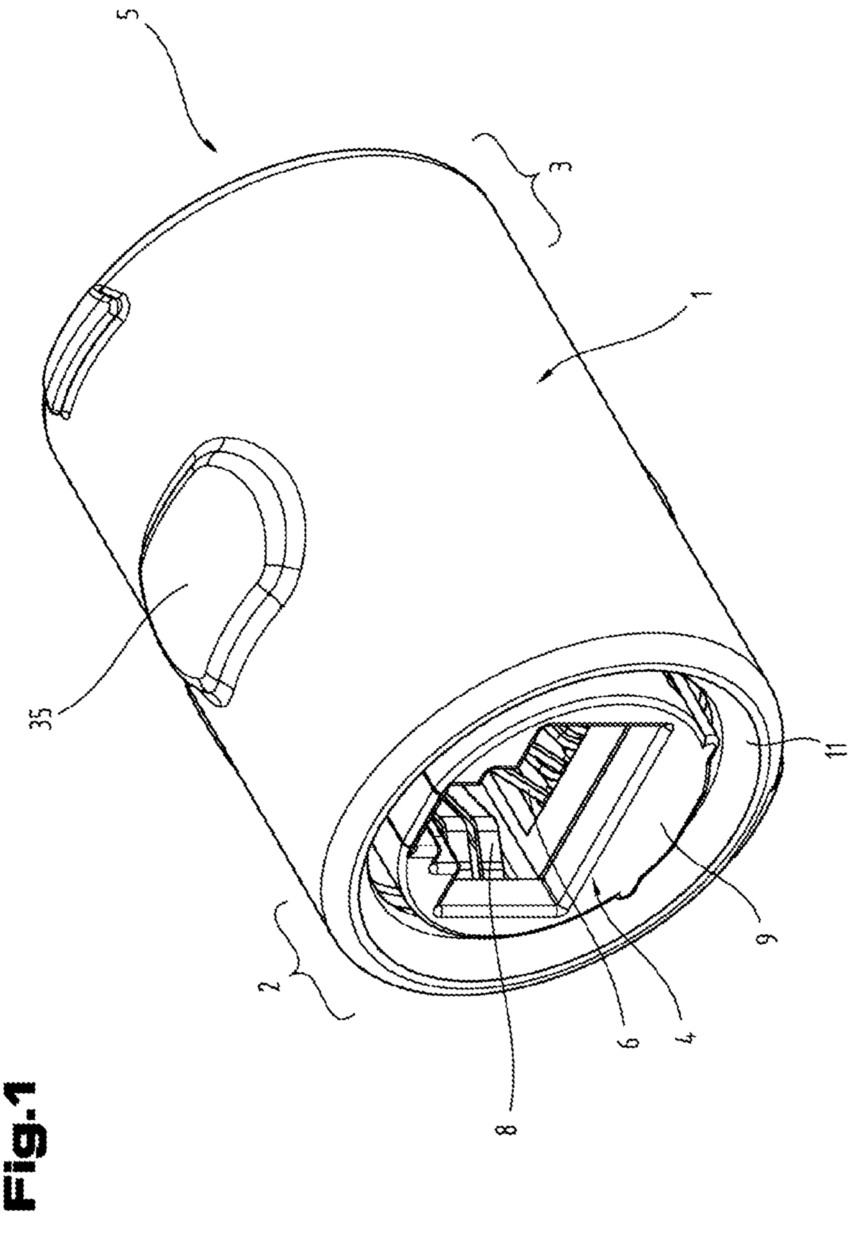
FIG. 1 shows a perspective view of a plug connector coupling according to the invention.

The plug connector coupling illustrated in a perspective view in FIG. 1 is illustrated by way of example in an embodiment for use with data plugs, preferably RJ45 plugs up to category 6. The structure according to the invention can of course also be transferred to other types of flush-type plug connectors or couplers. The solution according to the invention can thus also be used for plug connectors according to the XLR standard, for jack plugs, or the like.

Two plug sockets 2, 3, into the plug-in openings 4, 5 of which complementary plug connectors can be plugged, are formed on a housing 1. The plug sockets 2, 3 are positioned on a common longitudinal center axis M in such a way that they constitute an arrangement which is symmetrical about a transverse central plane.

Electrical contact elements 6, 7 as well as if need be also ground contacts 8 are fixed in each case in a contact carrier 9, 10 of each plug socket 2, 3, wherein the contact carriers 9, 10 are held inside the housing 1. The contact elements 6 of one plug socket 2 are connected to the contact elements 7 of the opposite plug socket 3, preferably in a crossed arrangement.

Figure 2:
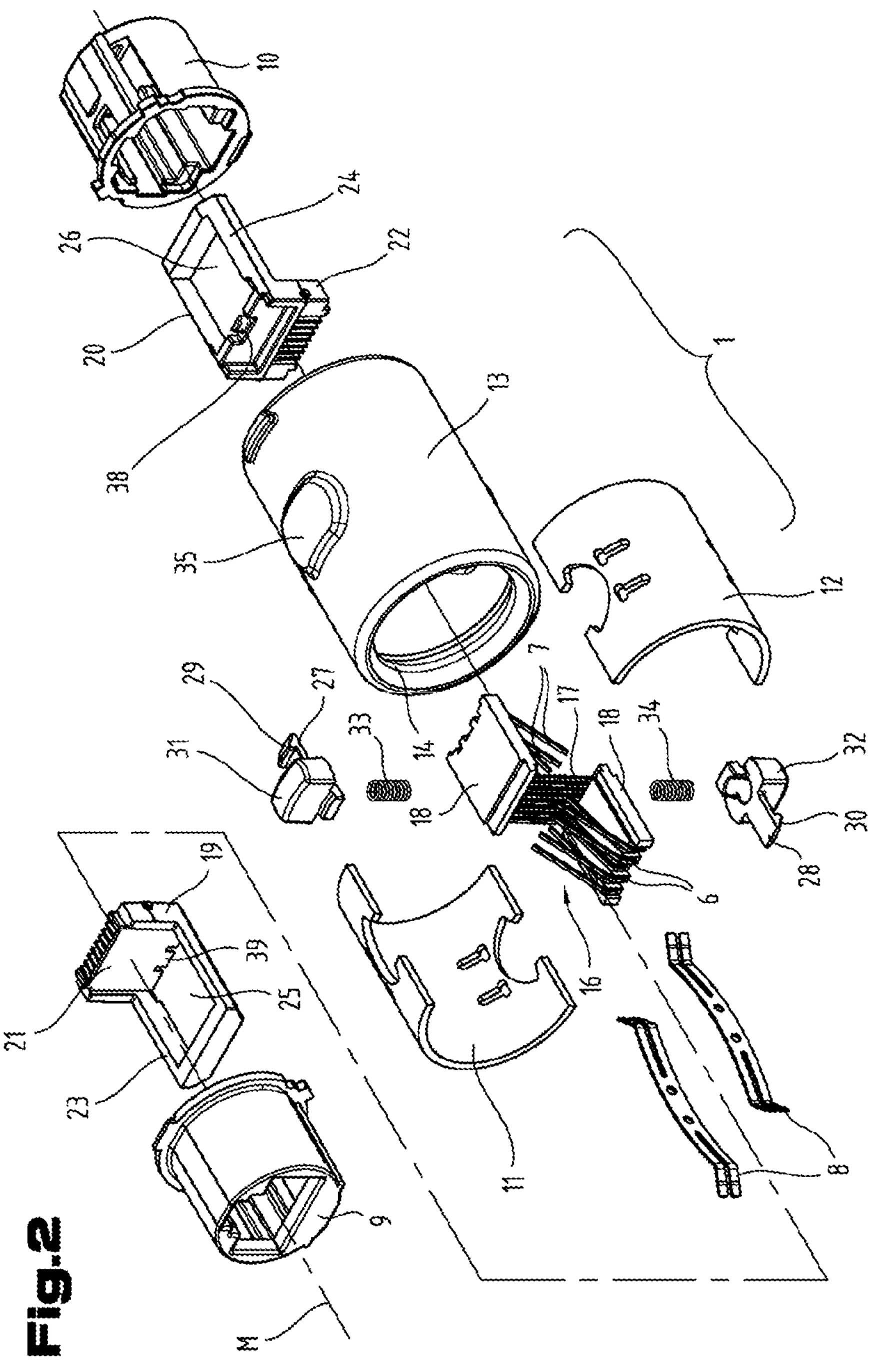
FIG. 2 shows an exploded view of the coupling in FIG. 1.
Figure 3:
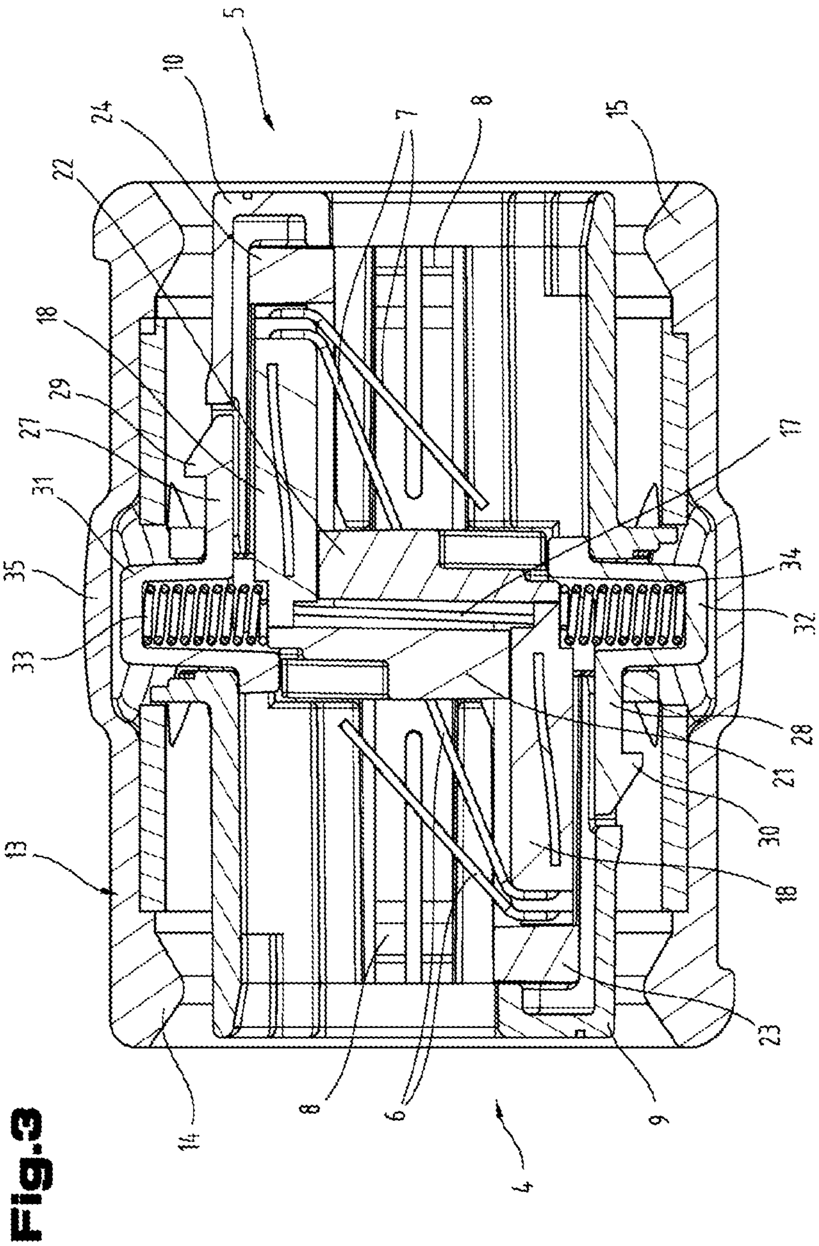
FIG. 3 shows a longitudinal section through the coupling in FIG. 1 along the vertical longitudinal central plane.

As is clear from the exploded view in FIG. 2 and also from the longitudinal section in FIG. 3, the plug sockets are present such that they are arranged rotated about the common axis, preferably the longitudinal center axis M, by 180° relative to each other. The plug-in openings 4, 5 oriented in opposite directions likewise have this rotated arrangement in the same way as the contact carrier 9 is rotated about the longitudinal center axis M by 180° relative to the contact carrier 10, oriented in the opposite direction, on the other side of the coupling.

The contact carriers 9, 10 are held together by two half-shells 11, 12 and are fixed in their position relative to each other, said half-shells 11, 12 together forming a shell split in the vertical longitudinal central plane. The half-shells 11, 12 are held together and pressed against each other by a sleeve 13 made from an elastic material, preferably a plastic or rubber. In addition to this function of the sleeve 13 for the mechanical stability of the cable plug coupling, it also assumes a sealing function in order to seal the respective plug socket 2, 3 from moisture and dirt when the cable plug is plugged in. For this purpose, the sleeve 13 protrudes beyond the two half-shells 11, 12 at preferably both ends but does not project, or does so only slightly, beyond the end side of the respective contact carrier 9, 10. In its end region, preferably in both end regions, the sleeve 13 in each case has a sealing lip 14, 15 around the periphery of the plug-in opening 4, 5 and facing radially inward toward the central center axis M, in both protruding edge sections.

The electrical contact elements 6, 7 are held inside the two contact carriers 9, 10 and the half-shells 11, 12. They are typically part of a contact set 16 in which the contact elements 6, 7 of the respective plug sockets 2, 3 are connected by central connecting sections 17, wherein the contact elements are routed so that they are crossed in the contact set 16 and are arranged so that they are rotated about the common axis by 180° relative to each other on the opposite sides. The contact set 16 which is preferably configured in a Z shape and typically designed as a conventional standard part also comprises preferably two insulating bodies 18 made from electrically insulating material in its central section, adjoining the central connecting sections 17 on both sides, in which insulating bodies the contact elements 6, 7, 17 are held fixed in their relative position to each other. The insulating bodies 18 are typically made from insulating plastic and are injection-molded around the contact elements 6, 7, 17. They are preferably designed as cuboid elements.

The contact set 16 is preferably inserted in a frame 19, 20, the sides of which situated opposite each other along the common axis M being pushed into the contact carriers 9, 10. The frame 19, 20 is here preferably designed from two frame parts 19, 20 which are situated opposite each other with reference to the common axis M and overlap each other in the central section of the contact set 16, viewed in the direction of the common axis. Each frame part 19, 20 is configured in an L-shape, viewed in longitudinal section, wherein a vertically protruding second limb 23, 24 extending in parallel to the longitudinal center axis M projects into the contact carriers 9, 10 at a limb 21, 22 which comes to bear centrally against the contact set 16 and is preferably guided and positioned there. A recess 25, 26 in which the insulating body 18 of the respective side of the contact set 16 is inserted and in this way positioned and fixed precisely, is formed in the second limb 23, 24.

The plug connector coupling comprises as a further functional assembly at least one locking assembly 27 to 34 for each cable plug in the plug socket 2, 3. In the example illustrated, this assembly comprises in each case one locking arm 27, 28 per side, i.e. per plug socket 2, 3, which is provided with a locking projection 29, 30 which, in the plugged-in state of the cable plug, engages in a complementary locking structure on the cable plug and holds the latter fixed in the plug-in opening 4, 5. The locking arms 27, 28 are situated exactly opposite each other preferably with respect to the common longitudinal center axis M.

The unlocking is affected separately for each plug socket 2, 3 manually via in each case an actuating element 31, 32 which, starting from a passive position, can be displaced manually, counter to the action in each case of a restoring spring 33, 34 as a preferred embodiment of an elastic restoring element, into an active position in which the locking projection 29, 30 and the complementary locking structure are held out of engagement on the cable plug. In the embodiment of the coupling illustrated, the actuating element 31, 32 and the locking arm 27, 28 are designed as integral and essentially rigid such that, when the actuating element 31, 32 is displaced into the active position, the locking arm 27, 28 is carried along at the same time and is displaced in the same way in order to be disengaged from the locking structure on the cable plug.

The restoring spring 33, 34 is preferably supported on the associated frame part 19, 20 which for this purpose in each case has a peg 38, 39 for fixing the restoring spring 33, 34 in position. The combination of the actuating element 31, 32 and the locking arm 27, 28 is in turn supported on the restoring spring 33, 34 and is thus likewise securely positioned and also fixed in its position relative to the housing 1, transversely to the direction of movement between the passive position and the active position.

Whereas in the preferred exemplary embodiment illustrated in the drawings of a plug connector coupling, the locking assemblies 27 to 34 are equipped with in each case an independent actuating element 31, 32 and an independent restoring element 33, 34 and can be actuated independently of each other, just one common actuating element could also be present for both locking assemblies and be coupled to both locking arms, for example via flexible force-transmission elements which transmits the actuating movement in the circumferential direction to both locking arms. Hybrid forms could also be conceivable, wherein direct actuation of the locking arm by the actuating element takes place for one locking assembly, or these elements are combined as explained above in one component, and wherein a rigid or flexible force-transmission arrangement from the actuating element to the separate locking arm is present for the opposite locking assembly.

In each case, the actuating element 31, 32 is advantageously displaced between the active position and the passive position, or vice versa, in a direction which is predominantly radial with reference to the common axis M. The actuating element 31 is here situated, preferably exactly diametrically with respect to the second independent actuating element 32, i.e. with reference to the common axis M of the coupling, on sides which are opposite each other by 180 degrees. A design, which can per se be implemented independently, with actuating elements 31, 32 which lie in one and the same plane which is oriented transversely to the common longitudinal center axis M is preferred here. This plane is preferably the longitudinal central plane of the housing 1.

Because the actuating element 31, 32 is preferably also covered by the sleeve 13 in order also to prevent penetration of moisture or dirt here, the sleeve 13 must, in the region above the actuating element 31, 32, offer the possibility of easily and safely touching the latter by hand and then also displacing it by hand between the passive position and the active position by actuation by the user. For this purpose, for example, a thinner portion can be provided in the sleeve 13, a small raised portion 35 can indicate the position of the actuating element 31, 32, a separately manufactured insert could be installed in an opening at this point, or the like.

The exemplary embodiments show possible alternative embodiments, wherein it should be noted at this point that the invention is not restricted to the specifically illustrated alternative embodiments thereof and instead various combinations of the individual alternative embodiments with one another are also possible, and this possibility for variation because of the technical teaching by the present invention is known to a person skilled in this art.

The scope of protection is determined by the claims. The description and the drawings are, however, to be used to interpret the claims. Individual features or combinations of features from the various exemplary embodiments shown and described can constitute independent inventive solutions. The object on which the independent inventive solutions are based can be found in the description.

All specified value ranges in the present description should be understood as also encompassing any and all subranges, for example the specification 1 to 10 is to be understood to mean that all subranges starting from the lower limit 1 and the upper limit 10 are also encompassed, i.e. all subranges begin with a lower limit of 1 or higher and end with an upper limit of 10 or lower, for example 1 to 1.7, or 3.2 to 8.1, or 5.5 to 10.

For the record, it should in conclusion be noted that elements have sometimes been illustrated as not true to scale and/or enlarged and/or reduced in size for a better understanding of the structure.

LIST OF REFERENCE SIGNS

1 housing
2 plug socket
3 plug socket
4 plug-in opening
5 plug-in opening
6 contact element
7 contact element
8 ground contact
9 contact carrier
10 contact carrier
11 half-shell
12 half-shell
13 sleeve
14 sealing lip
15 sealing lip
16 contact set
17 connecting section
18 insulating body
19 frame part
20 frame part
21 limb
22 limb
23 second limb
24 second limb
25 recess
26 recess
27 locking arm
28 locking arm
29 locking projection
30 locking projection
31 actuating element
32 actuating element
33 restoring spring
34 restoring spring
35 raised portion
38 peg
39 peg

The invention claimed is:

1. A plug connector coupling, comprising:

a housing;

at least two plug sockets which are formed in the housing, for producing a plug connection to in each case one cable plug, wherein the plug sockets are arranged one behind the other on a common axis and rotated about the common axis by 180° relative to each other and have plug-in openings, oriented in opposite directions, for cable plugs;

at least one electrical contact element in each of the plug sockets which is connected electrically conductively to at least one electrical contact element of another plug socket;

at least one locking assembly for each cable plug in the plug socket, comprising at least one locking arm with in each case at least one locking structure, which, in a plugged-in state of the cable plug, engages in a complementary locking structure at the cable plug, at least one actuating element which starting from a passive position, can be displaced counter to the action of a restoring element, by hand into an active position in which the locking structure and the complementary locking structure are disengaged, wherein the contact elements of both plug sockets are part of a common contact set in which the contact elements are routed so that they cross each other and are arranged on opposite sides so that they are rotated about the common axis by 180° relative to each other, and two locking arms are arranged opposite each other with respect to the common axis.

2. The coupling as claimed in claim 1, wherein the locking assemblies are equipped with in each case an independent actuating element and an independent restoring element and can be actuated independently of each other.

3. The coupling as claimed in claim 1, wherein the at least one actuating element includes a plurality of actuating elements, and the actuating elements are arranged on sides opposite each other by 180 degrees with reference to the common axis and/or are arranged in the same plane transversely to the common axis, in a longitudinal central plane.

4. The coupling as claimed in claim 1, wherein the at least one actuating element includes a plurality of actuating elements, and a direction of displacement of the actuating elements between the passive position thereof and the active position thereof predominantly runs radially with reference to the common axis.

5. The coupling as claimed in claim 1, wherein the at least one locking arm is rigidly connected to its actuating element, and is designed as a single piece therewith.

6. The coupling as claimed in claim 1, wherein the housing comprises two contact carriers and a shell fixing said contact carriers in position relative to each other, and wherein the contact carriers are arranged on the common axis, and rotated about the common axis by 180° relative to each other.

7. The coupling as claimed in claim 6, wherein the shell consists of two half-shells split in a direction of the common axis which are held together by a sleeve made from non-metallic material, and wherein the sleeve is made from an elastic material and presses the half-shells against each other.

8. The coupling as claimed in claim 7, wherein the at least one actuating element includes a plurality of actuating elements, and the sleeve also covers the actuating elements and has structures in a region of the actuating elements in order to enable manual displacement of the actuating elements.

9. The coupling as claimed in claim 7, wherein the sleeve protrudes beyond the two half-shells in a direction of the common axis at least at the one end and has a radially inward facing sealing lip at an inner edge region of one end.

10. The coupling as claimed in claim 6, wherein the contact set is inserted into a frame, opposite sides of which along the common axis are pushed into the contact carriers, wherein the frame is designed from two frame parts which are opposite each other with reference to the common axis and overlap each other in a central section of the contact set, viewed in a direction of the common axis.

11. The coupling as claimed in claim 10, wherein at least parts of the locking assembly, are supported or held in or on the frame.

12. The coupling as claimed in claim 8, wherein the sleeve protrudes beyond the two half-shells in the direction of the common axis at least at the one end and has a radially inward facing sealing lip at an inner edge region of one end.

* * * * *